United States Patent
Jang et al.

(10) Patent No.: US 10,632,726 B2
(45) Date of Patent: Apr. 28, 2020

(54) SELECTIVE CONTINUOUS TRANSFERRING APPARATUS BASED ON ADHESION-CONTROLLED FILM

(71) Applicant: KOREA INSTITUTE OF MACHINERY & MATERIALS, Daejeon (KR)

(72) Inventors: Bongkyun Jang, Daejeon (KR); Jae-Hyun Kim, Daejeon (KR); Kwang-Seop Kim, Daejeon (KR); Hak-Joo Lee, Daejeon (KR); Byung-Ik Choi, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 6 days.

(21) Appl. No.: 15/747,147

(22) PCT Filed: Jul. 20, 2016

(86) PCT No.: PCT/KR2016/007878
§ 371 (c)(1),
(2) Date: Jan. 23, 2018

(87) PCT Pub. No.: WO2017/018711
PCT Pub. Date: Feb. 2, 2017

(65) Prior Publication Data
US 2018/0215133 A1     Aug. 2, 2018

(30) Foreign Application Priority Data
Jul. 24, 2015   (KR) .......................... 10-2015-0104994

(51) Int. Cl.
*B32B 37/22* (2006.01)
*B41F 16/00* (2006.01)
(Continued)

(52) U.S. Cl.
CPC .............. *B32B 37/22* (2013.01); *B29C 66/81* (2013.01); *B32B 37/0053* (2013.01);
(Continued)

(58) Field of Classification Search
CPC ... B32B 37/0053; B32B 37/025; B32B 37/06; B32B 37/1207; B32B 37/1292;
(Continued)

(56) References Cited

U.S. PATENT DOCUMENTS

2005/0260413 A1\* 11/2005 Tateishi .................... B32B 7/06
                                                            428/411.1
2012/0313241 A1    12/2012 Bower
2015/0217550 A1\*  8/2015 Gosnell .................. B42D 25/29
                                                            156/249

FOREIGN PATENT DOCUMENTS

JP    2011-194717 A    10/2011
JP    2012-201368 A    10/2012
(Continued)

OTHER PUBLICATIONS

English translation of JP2011194717.\*
(Continued)

*Primary Examiner* — Sonya M Sengupta
(74) *Attorney, Agent, or Firm* — Hauptman Ham, LLP (57) ABSTRACT

A selective continuous transferring apparatus includes a roll and a sticking layer. The roll has an elastic surface, and contacts a source substrate with a receiving substrate to transfer elements on the source substrate to a lower surface of the receiving substrate 520. A plurality of the elements is arranged on an upper surface of the source substrate. The sticking layer has a predetermined pattern in a partial area of the lower surface of the receiving substrate. The elements are attached to the sticking layer. The roll pressurizes a series of stacked layer of the source substrate, the elements and the
(Continued)

receiving substrate, so that the elements disposed corresponding to the sticking layer of the receiving substrate are partially and selectively transferred on the receiving substrate.

7 Claims, 5 Drawing Sheets (51) Int. Cl.
*B32B 37/00* (2006.01)
*B32B 37/06* (2006.01)
*B32B 37/12* (2006.01)
*B41F 33/00* (2006.01)
*B29C 65/00* (2006.01)
*B29C 65/78* (2006.01)
*B29C 53/56* (2006.01)

(52) U.S. Cl.
CPC .......... *B32B 37/1292* (2013.01); *B41F 16/00* (2013.01); *B29C 53/562* (2013.01); *B29C 65/7802* (2013.01); *B32B 37/025* (2013.01); *B32B 37/06* (2013.01); *B32B 37/1207* (2013.01); *B41F 33/00* (2013.01)

(58) Field of Classification Search
CPC .......... B32B 37/22; B41F 16/00; B41F 33/00; B29C 53/562; B29C 65/7802; B29C 66/81
USPC ......................................... 156/449, 555, 580
See application file for complete search history.

(56) References Cited

FOREIGN PATENT DOCUMENTS

| JP | 2013-056469 A | 3/2013 |
| KR | 10-2010-0066846 A | 6/2010 |
| KR | 10-1521205 B1 | 5/2015 |

OTHER PUBLICATIONS

English translation of JP2012201368.*
English translation of KR20100066846.*
English translation of JP2012056469.*
English translation of KR101521205.*
International Search Report for International Application No. PCT/KR2016/007878, dated Oct. 14, 2016, 4 pp.

* cited by examiner

SELECTIVE CONTINUOUS TRANSFERRING APPARATUS BASED ON ADHESION-CONTROLLED FILM

CROSS-REFERENCE TO RELATED APPLICATIONS

This application is a U.S. National Phase of International Application No. PCT/KR2016/007878, filed on Jul. 20, 2016, and claims priority under 35 U.S.C. § 119 to Korean Patent Application No. 10-2015-0104994, filed on Jul. 24, 2015 in the Korean Intellectual Property Office (KIPO).

BACKGROUND

1. Field of Disclosure

The present disclosure of invention relates to a selective continuous transferring apparatus using an adhesion-controlled film, and more specifically the present disclosure of invention relates to the selective continuous transferring apparatus using an adhesion-controlled film, which is used for various kinds of electrical device such as a semiconductor device, a memory, a sensor and so on, having a pattern of several nanometers with various kinds of materials and capable of high signal processing, high capacity, high sensitivity, high efficiency and so on. Thus, selective continuous transferring may be performed in the continuous transferring process using a roll.

Generally, in manufacturing the electrical device based on a wafer using a semiconductor manufacturing process, various kinds of processes such as coating, exposing, developing, etching, thin-film forming, ion implanting, oxidizing, diffusing and so on, are performed on the wafer. Then, various kinds of packing processes such as dicing, die bonding, wire bonding, molding and so on, are performed to form a part or an element. The semiconductor or the memory chip are manufactured via the above-mentioned processes.

A flexible device manufactured via printed electronics is recently developed, and some products such as a display, a RFID, a solar cell module and so on, are manufactured using the printed electronics. The printed electronics is performed in a room temperature or a relatively lower temperature compared to the semiconductor process. In the printed electronics, coating, printing, patterning and so on are performed to manufacture the device, back-end processes such as wiring and forming electrode are performed, and then bonding or cutting are performed to form a final flexible device.

2. Description of Related Technology

In forming a device using an element, a space for the wiring and etc. is necessary. For example, a space between the elements is necessary, but when all elements are entirely transferred on the wafer, the space between the elements may not be formed and thus the device is hard to be manufactured. In addition, when the device includes various kinds of elements, a later formed element may be formed adjacent to a former formed element and thus a space and an alignment should be considered. Accordingly, in the element transferring process forming the device, the elements should be selectively transferred.

In a plane transferring process, the selective transferring process using a patterned stamp is disclosed. In U.S. laid-open patent application No. 2012-0313241 ("Methods for surface attachment of flipped active components", 2012 Dec. 13.), the stamp having a protrusion arranged substantially same as a plurality of elements arranged in a source substrate is used to transfer the elements on the protrusion of the stamp, and the protrusion is selectively formed in portions of a transferred substrate, and thus the elements are transferred on the protrusion of the transferred substrate. Accordingly, the selective transferring is performed.

However, the technology disclosed in the U.S. 2012-0313241 is applied on the plane substrate formed via the plane transferring process. Thus, the above-mentioned process is hard to be applied to a thin-film type flexible substrate which is used more recently and doses not has the protrusion or a predetermined thickness as the transferred substrate. For example, in the thin-film type flexible substrate, a roll stamp is used instead of the plane stamp and thus the prior art is hard to be applied to the continuous transferring process.

As a selective continuous transferring technology not the plane transferring technology, in the prior art, a contact between the roll stamp and the transferred element is controlled to perform the selective continuous transferring. Here, the selective continuous transferring may be performed based on the roll stamp, but the roll stamp is hard to be changed and thus the transferred pattern should not be changed.

Accordingly, in the selective continuous transferring using the roll such as manufacturing the flexible substrate device, the technology in which the selective transferring is performed efficiently and easily should be developed.

A related prior art is the above-mentioned U.S. laid-open patent application No. 2012-0313241 ("Methods for surface attachment of flipped active components", 2012 Dec. 13.).

SUMMARY

The present invention is developed to solve the above-mentioned problems of the related arts. The present invention provides a selective continuous transferring apparatus using an adhesion-controlled film, capable of selective transferring more easily and more efficiently in the continuous transferring process using the roll such as the manufacturing process for the flexible substrate device.

According to an example embodiment, a selective continuous transferring apparatus includes a roll 100 and a sticking layer 530. The roll 100 has an elastic surface, and contacts a source substrate 510 with a receiving substrate 520 to transfer elements 550 on the source substrate 510 to a lower surface of the receiving substrate 520. A plurality of the elements 550 is arranged on an upper surface of the source substrate 510. The sticking layer 530 has a predetermined pattern in a partial area of the lower surface of the receiving substrate 520. The elements 550 are attached to the sticking layer 530. The roll 100 pressurizes a series of stacked layer of the source substrate 510, the elements 550 and the receiving substrate 520, so that the elements 550 disposed corresponding to the sticking layer 530 of the receiving substrate 520 are partially and selectively transferred on the receiving substrate 520.

In an example, an adhesive may be entirely coated on the lower surface of the receiving substrate 520, and a partial area of the lower surface of the receiving substrate 520 may be protruded with a predetermined pattern to form the sticking layer 530.

In an example, an adhesive may be coated on or a light may be irradiated on a partial area of the lower surface of the receiving substrate 520 to form the sticking layer 530.

In an example, the receiving substrate 520 may include an adhesive material, and a non-adhesive material may be coated on or non-adhesive surface treatment may be performed on a partial area of the lower surface of the receiving substrate 520 with a pattern reverse to a predetermined pattern so that the sticking layer 530 is formed with the predetermined pattern.

In an example, the selective continuous transferring apparatus may further include a sticking layer activating part 110 disposed at a front of the roll 100 along an advancing direction of the receiving substrate 520, and coating the adhesive or irradiating the light to form the sticking layer 530. In an example, the selective continuous transferring apparatus may further include a sticking layer inactivating part 120 disposed at a rear of the roll 100 along the advancing direction of the receiving substrate 520, and removing the adhesive or irradiating the light to remove the sticking layer 530.

In an example, a plurality of the rolls may be arranged adjacent to each other for the transferring.

According to the present example embodiments, in the continuous transferring process using the roll such as the manufacturing process for the flexible substrate device, the selective transferring in which the element is transferred in a predetermined position, is performed more easily and more efficiently.

The printed electronics is recently applied to manufacturing the semiconductor, and the device using the flexible substrate is increased, and thus the continuous transferring process using the roll such as the manufacturing process for the flexible substrate device having better productivity may be used more widely. In manufacturing the device, the space between the elements is necessary or various kinds of elements are formed, and thus the selective transferring should be performed. In the conventional process, the selective transferring is performed only in the plane substrate using the patterned stamp and is not applied to manufacturing the flexible substrate device.

However, in the present example embodiments, the selective transferring may be performed in the continuous transferring using the roll. Thus, the productivity of the continuous transferring and the variety of producing of the selective transferring may be performed at the same time.

*REFERENCE NUMERALS

100: roll
110: sticking layer activating part    120: sticking layer inactivating part 510: source substrate    520: receiving substrate
530: sticking layer    550: element

DETAILED DESCRIPTION

Hereinafter, the embodiments of the present invention will be described in detail with reference to the accompanied drawings.

A continuous transferring process, as mentioned above, is applied for manufacturing the semiconductor using a flexible substrate, and thus a roll (instead of a plane stamp used for manufacturing a plane substrate) is used to transmit the flexible substrate or transfer on the flexible substrate. In the selective continuous transferring apparatus of the embodiments of the present invention, the roll is used and the transferring is selectively performed. Here, an element or a substrate makes contact with a film in which the adhesiveness is selectively controlled, an element or a substrate, using the roll, and thus the selectively transferring may be performed.

In the embodiments of the present invention, an element 550 arranged in a source substrate 510 is directly transferred on a receiving substrate 520. Generally, in the element transferring process, the element is transferred from the source substrate to the roll, and then the element is transferred from the roll to the receiving substrate, which means that the transferring is performed twice (the source substrate—the roll, the roll—the receiving substrate). However, in the embodiments of the present invention, the transferring is performed only once (the source substrate—the receiving substrate), and thus the number of the processes is decreased. Accordingly, in the embodiments of the present invention, the receiving substrate 520 makes direct contact with the source substrate 510 on which the element 550 is arranged, and thus the element is directly transferred from the source substrate to the receiving substrate.

FIGS. 1 to 5 illustrate first to third example embodiment of the present invention, and as illustrated in figures, a contacting force between the roll and the element or the substrate is selectively controlled. In the embodiments of the present invention of FIGS. 1 to 5, the selective continuous transferring apparatus includes the roll 100 and the sticking layer 530 to control the contact among the source substrate 510, the receiving substrate 520 and the element 550. In addition, the selective continuous transferring apparatus pressurize a series of stacked layer of the source substrate 510, the elements 550 and the receiving substrate 520, so that the elements 550 disposed corresponding to the sticking layer 530 of the receiving substrate 520 are partially and selectively transferred on the receiving substrate 520.

The roll 100 has an elastic surface, and contacts the source substrate 510 with the receiving substrate 520 to transfer the elements 550 on the source substrate 510 to a lower surface of the receiving substrate 520. Here, a plurality of the elements 550 is arranged on an upper surface of the source substrate 510. As an example of the elastic material of the roll 100, PDMS which is widely used for the roll or the stamp for the transferring, may be used.

In the embodiments of the present invention, a single roll 100 is used for the transferring, but a plurality of the rolls 100 may be arranged adjacent to each other for the transferring.

The sticking layer 530 has a predetermined pattern in a partial area of the lower surface of the receiving substrate 520, and the elements 550 are attached to the sticking layer 530. Hereinafter, the forming of the sticking layer 530 may be explained.

First Example Embodiment

Figure 1:
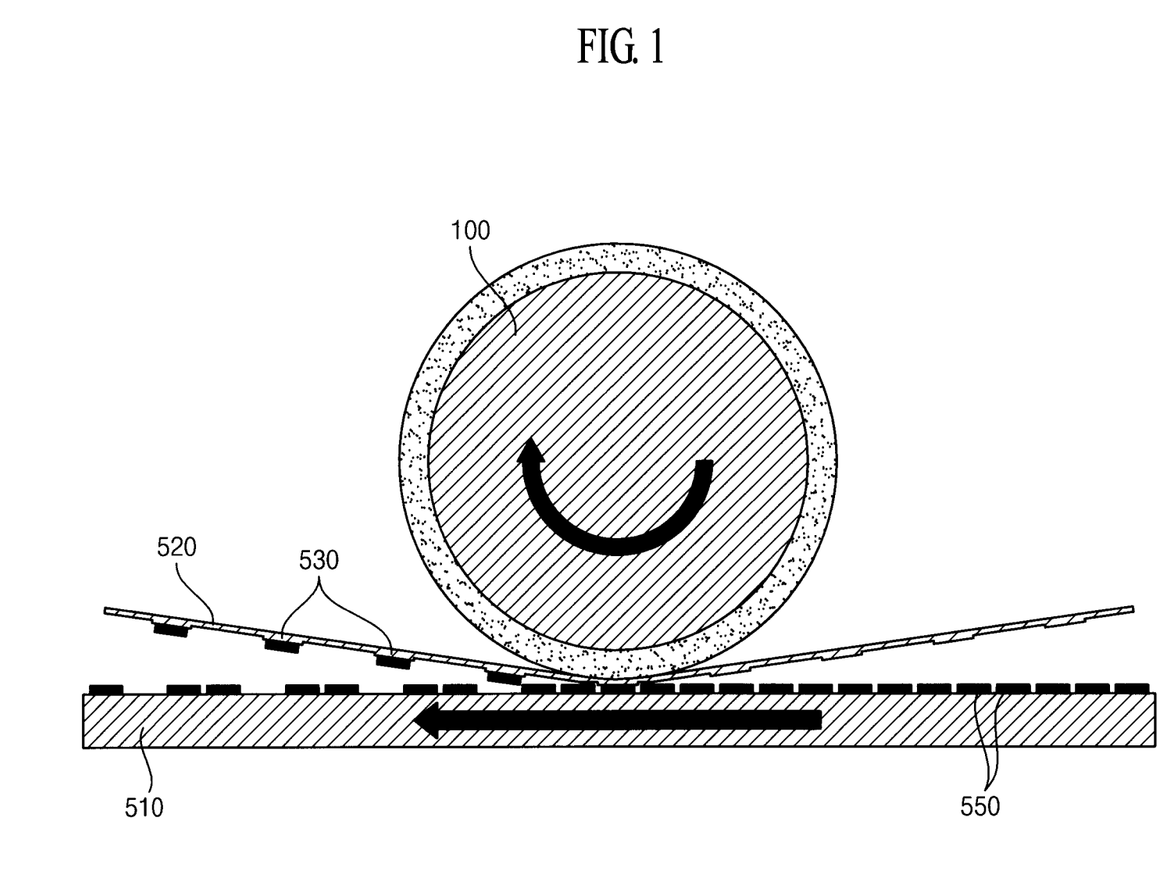
FIG. 1 is a cross-sectional view illustrating a selective continuous transferring apparatus according to a first example embodiment of the present invention.

FIG. 1 is a cross-sectional view illustrating a selective continuous transferring apparatus according to a first example embodiment of the present invention. In the present example embodiment, an adhesive is entirely coated on the receiving substrate 520, and a partial area of the lower surface of the receiving substrate 520 is protruded with a predetermined pattern to form the sticking layer 530.

More specifically, the receiving substrate 520 is a flexible substrate with a film type. When the receiving substrate 520 is mounted on the source substrate 510 on which the element 550 is disposed, and the roll 100 presses the receiving substrate 520, the element 550 is transferred from the source substrate 510 to the receiving substrate 520. Here, a partial area of the receiving substrate 520 is protruded, and thus the contact is not performed in a non-protruded area even though the roll 100 presses a series of stacked layer of the source substrate 510 and the receiving substrate 520. For example, in the non-protruded area of the receiving substrate 520, which is an area except for the sticking layer 530, the element 550 does not make contact with the receiving substrate 520, and thus only in the protruded area of the receiving substrate 520, which is an area of the sticking layer 530, the element 550 is transferred from the source substrate 510 to the receiving substrate 520. Accordingly, the element is selectively transferred from the source substrate 510 to the receiving substrate 520 via the sticking layer 530 which is formed as the protruding area.

As explained above, conventionally the element is transferred twice (the source substrate—the roll, the roll—the receiving substrate), but in the present example embodiment, the element is transferred only once (the source substrate—the receiving substrate), and thus the number of the transferring processes is decreased and the selectively transferring may be available.

Figure 2:
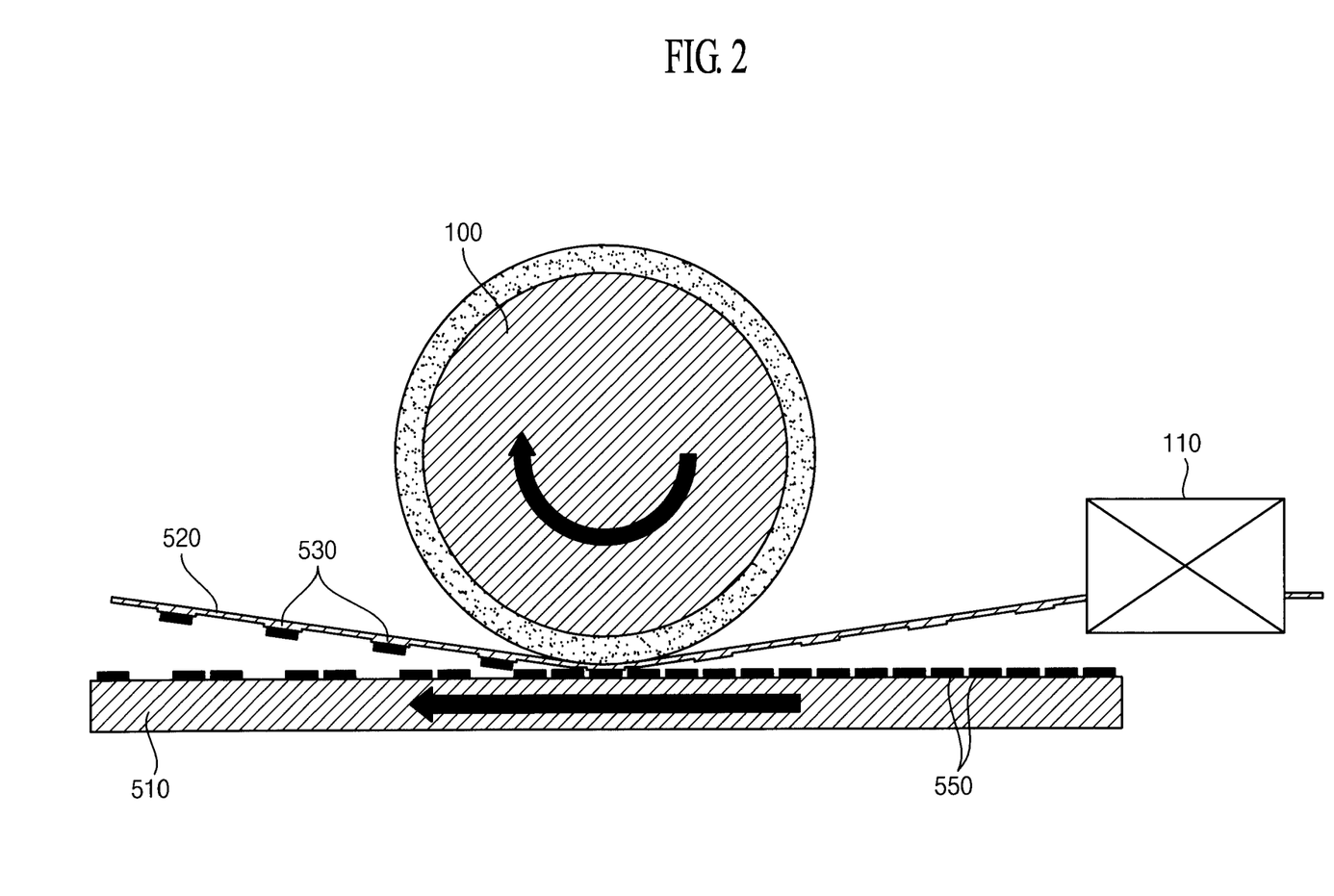
FIG. 2 is a cross-sectional view illustrating a selective continuous transferring apparatus according to an example embodiment of the first example embodiment.

FIG. 2 is a cross-sectional view illustrating a selective continuous transferring apparatus according to an example embodiment of the first example embodiment. The protrusions of the receiving substrate 520 may be formed in forming the receiving substrate 520. However, the receiving substrate 520 is a film shape and is provided with a wrapping roll, and thus the receiving substrate 520 is hard to be provided in coated with the adhesive. Thus, the coating of the adhesive on the receiving substrate 520 should be performed right before pressurizing or transferring.

Thus, the selective continuous transferring apparatus may further include a sticking layer activating part 110 disposed at a front of the roll 100 along an advancing direction of the receiving substrate 520, and coating the adhesive or irradiating the light to form the sticking layer 530. FIG. 2 illustrates the sticking layer activating part 110. In the first example embodiment, the adhesive is entirely coated on the lower surface of the receiving substrate 520, but alternatively, the sticking layer 530 may be formed using methods different from the coating mentioned above. Thus, the sticking layer activating part 110 may perform the coating of the adhesive, and further may coat the adhesive with a predetermined pattern or may irradiate a light to form the predetermined pattern. Accordingly, the sticking layer activating part 110 may perform various kinds of pretreatment processes.

Second Example Embodiment

Figure 3:
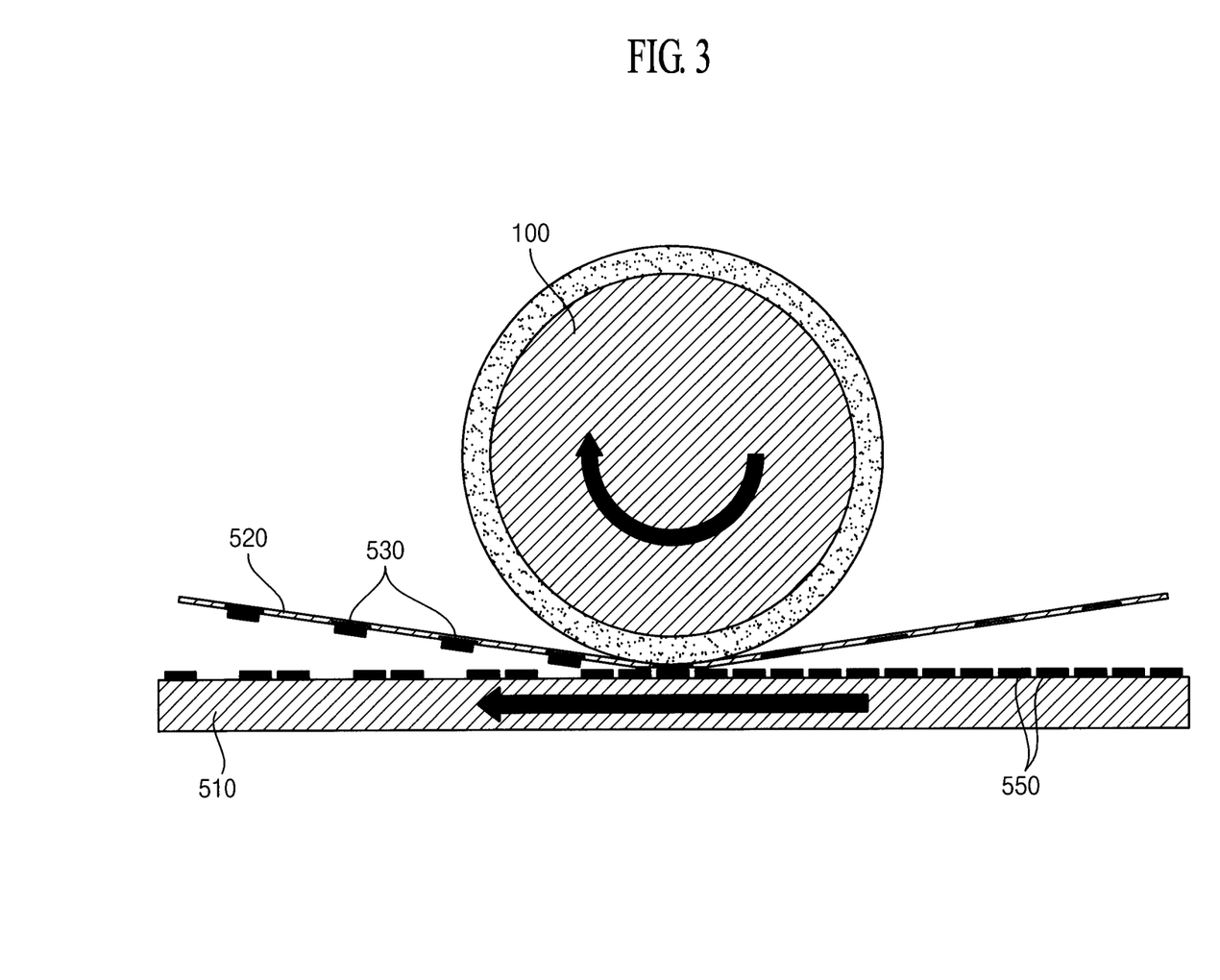
FIG. 3 is a cross-sectional view illustrating a selective continuous transferring apparatus according to a second example embodiment of the present invention.

FIG. 3 is a cross-sectional view illustrating a selective continuous transferring apparatus according to a second example embodiment of the present invention. In the present example embodiment, the adhesive is coated on or the light is irradiated on the partial area of the lower surface of the receiving substrate 520 to form the sticking layer 530.

In the first example embodiment, the adhesive is entirely coated on the receiving substrate 520, and the partial area of the lower surface of the receiving substrate 520 is protruded with the predetermined pattern to form the sticking layer 530. However, the element 550 is relatively thin and small, and thus the contact may be performed in the non-protruded or non-contacting area as a pressurizing force is relatively increased in pressurizing the series of stacked layer of the source substrate 510, the elements 550 and the receiving substrate 520. Here, in the first example embodiment, the adhesive is entirely coated on the receiving substrate 520 and thus the transferring is performed in the entire contacting area. Thus, the variation of the pressurizing force may cause the transferring error. Further, in the first example embodiment, an additional process for forming the protruding area in the receiving substrate 520 is necessary to protrude a partial area of the receiving substrate 520.

In the present example embodiment, the receiving substrate 520 does not have protruded or concaved patterns and has merely a plane shape. In addition, the adhesive is coated with a predetermined pattern, or a material of the receiving substrate 520 or a material coated on the lower surface of the receiving substrate 520 is transformed into an adhesive material via the light irradiation so that the adhesive force is generated in the predetermined pattern. Thus, the sticking layer 530 may be formed. Here, the material transformed into the adhesive material may be an ultraviolet-ray curing adhesive film, a thermal release film, and so on, and the irradiated light may be ultraviolet rays, infrared light and so on. Alternatively, the materials or the lights used in manufacturing the semiconductor device may be used in the present example embodiment. In addition, as mentioned in the first example embodiment, the pretreatment process may be performed via the sticking layer activating part 110, and the sticking layer activating part 110 may be changed variously if the sticking layer activating part 110 coats the adhesive on the entire surface or with the predetermined pattern, or irradiates the light with the predetermined pattern. Further, the sticking layer activating part used in manufacturing the semiconductor device may be used in the present example embodiment.

Accordingly, in the second example embodiment, the receiving substrate 520 has a plane shape but the adhesive force is generated in the predetermined area such that the sticking layer 530 is formed. Thus, the receiving substrate 520 makes contact with the element 550 for the transferring via the pressurizing of the roll in the sticking layer 530, and the transferring is prevented in an area except for the sticking layer 530 even though the receiving substrate 520 makes contact with the element 550.

Figure 4:
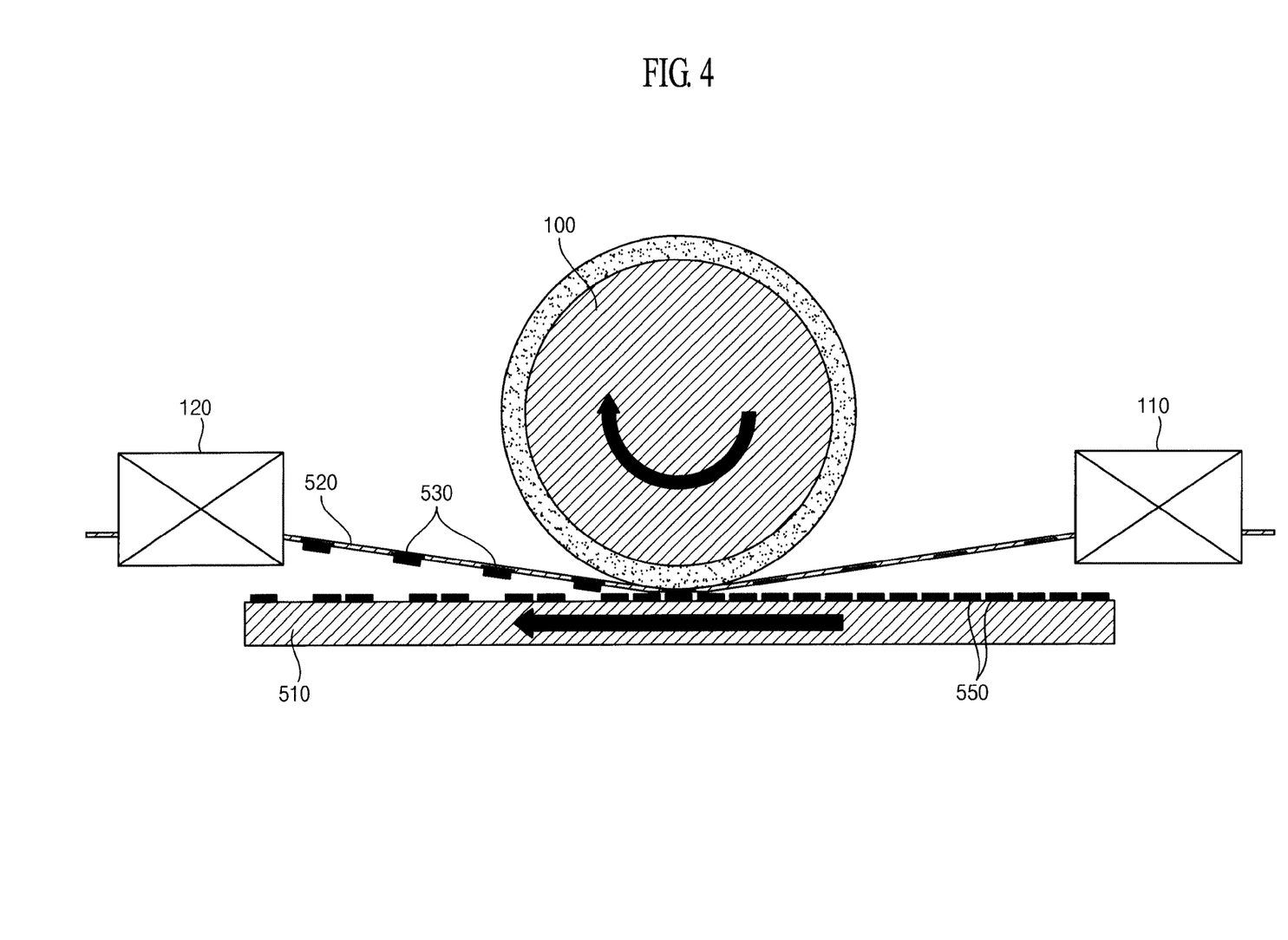
FIG. 4 is a cross-sectional view illustrating a selective continuous transferring apparatus according to an example embodiment of the second example embodiment.

FIG. 4 is a cross-sectional view illustrating a selective continuous transferring apparatus according to an example embodiment of the second example embodiment. In the second example embodiment, as mentioned above, the adhesive is partially coated on the receiving substrate 520 or the light is irradiated on the receiving substrate 520 to generate the adhesive force, and thus the transferring may be completed when the receiving substrate 520 is used as the finished product. Alternatively, when the element transferred on the receiving substrate 520 is transferred to other substrate, the receiving substrate 520 may be used as the source substrate for the other substrate, and then the receiving substrate 520 remains a vacant film after the additional transferring. Further, when the source substrate is used as the finished product, the selectively transferring may be used for removing the elements 550 from the source substrate via transferring the elements 550 to the receiving substrate 520.

Accordingly, the receiving substrate 520 may be recycled. Thus, in the first example embodiment, the receiving substrate 520 includes a fixed protrusions or fixed shape of sticking layer, but in the second example embodiment, the adhesive is coated or the light transforms the characteristics of the material, so that the receiving substrate 520 may be recycled or reused in the second example embodiment.

Thus, as illustrated in FIG. 4, the selective continuous transferring apparatus further includes a sticking layer inactivating part 120 disposed at a rear of the roll 100 along the advancing direction of the receiving substrate 520, and removing the adhesive or irradiating the light to remove the sticking layer 530. The sticking layer inactivating part 120 may correspond to the sticking layer activating part 110. For example, when the sticking layer activating part 110 coats the adhesive, the sticking layer inactivating part 120 removes the adhesive. Likewise, when the sticking layer activating part 110 irradiate the light to activate the adhesive force, the sticking layer inactivating part 120 irradiate the light to inactivate the adhesive force. Further, the sticking layer inactivating part used in manufacturing the semiconductor device may be used in the present example embodiment.

Third Example Embodiment

Figure 5:
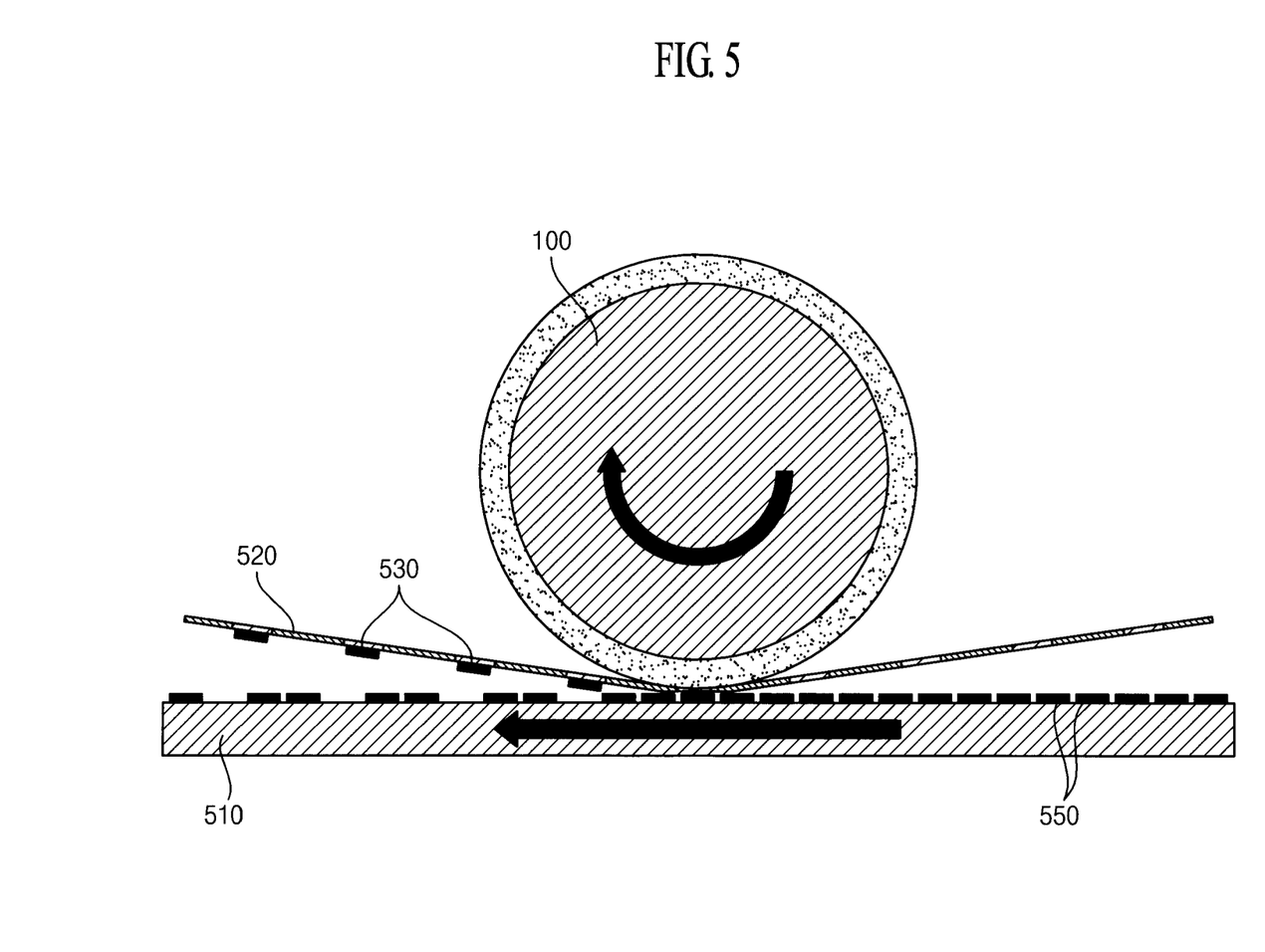
FIG. 5 is a cross-sectional view illustrating a selective continuous transferring apparatus according to a third example embodiment of the present invention.

FIG. 5 is a cross-sectional view illustrating a selective continuous transferring apparatus according to a third example embodiment of the present invention. In the present example embodiment, the receiving substrate 520 includes an adhesive material, and a non-adhesive material is coated on or non-adhesive surface treatment is performed on a partial area of the lower surface of the receiving substrate 520 with a pattern reverse to a predetermined pattern shape so that the sticking layer 530 is formed with the predetermined pattern.

In the third example embodiment, the selective continuous transferring apparatus functions reverse to the selective continuous transferring apparatus according to the second example embodiment. For example, PDMS used for the surface material of the roll 100 has elasticity and adhesiveness enough to adhere to relatively light material. Thus, when the receiving substrate 520 includes the material having the adhesiveness mentioned above, the transferring is performed whenever the receiving substrate 520 makes contact with the element 550. Here, to complete the selective transferring, the pretreatment should be performed to prevent the transferring from be performed even though the receiving substrate 520 having the adhesive material makes contact with the element 550. Thus, in the third example embodiment, the non-adhesive material is coated on or non-adhesive surface treatment is performed on the partial area of the lower surface of the receiving substrate 520 with the pattern reverse to the predetermined pattern shape so that the sticking layer 530 is formed with the predetermined pattern. Accordingly, the selective transferring may be performed in the area in which the predetermined pattern is formed.

For example, the receiving substrate 520 may be the flexible substrate, such as PET, PI, etc., and the adhesive may be coated on the receiving substrate 520. In addition, a polymer coating or a silicone super water-repellent coating may be performed on the receiving substrate 520 for the non-adhesiveness. Further, plasma super water-repellent surface treatment may be performed on the receiving substrate 520 for the non-adhesiveness.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A selective continuous transferring apparatus, comprising:
    a roll having an elastic surface, and causing a source substrate to contact with a receiving substrate to transfer a plurality of electrical devices arranged on an upper surface of the source substrate to a lower surface of the receiving substrate; and
    a sticking layer having a predetermined pattern in a partial area of the lower surface of the receiving substrate, the electrical devices being attached to a lower surface of the sticking layer,
    wherein the roll is disposed over the receiving substrate, and the receiving substrate is disposed over the source substrate, so that the roll downwardly pressurizes the receiving substrate toward the source substrate, and the electrical devices disposed on the upper surface of the source substrate are upwardly transferred onto the lower surface of the receiving substrate,
    wherein the electrical devices are spaced apart from each other, and
    wherein the receiving substrate is a flexible substrate, and the source substrate is not bent in the course of the transferring.

2. The selective continuous transferring apparatus of claim 1, wherein an adhesive is coated on an entirety of the lower surface of the receiving substrate, and the partial area of the lower surface of the receiving substrate is protruded in the predetermined pattern to form the sticking layer.

3. The selective continuous transferring apparatus of claim 1, wherein an adhesive is coated on or a light is irradiated on the partial area of the lower surface of the receiving substrate to form the sticking layer.

4. The selective continuous transferring apparatus of claim 1, wherein the receiving substrate includes an adhesive material, and a non-adhesive material is coated on or non-adhesive surface treatment is performed on the partial area of the lower surface of the receiving substrate with a pattern reverse to the predetermined pattern so that the sticking layer is formed with the predetermined pattern.

5. The selective continuous transferring apparatus of claim 1, further comprising:
    a sticking layer activating part disposed upstream of the roll along an advancing direction of the receiving substrate, and coating an adhesive or irradiating light on the partial area of the lower surface of the receiving substrate to form the sticking layer.

6. The selective continuous transferring apparatus of claim 5, further comprising:
    a sticking layer inactivating part disposed downstream of the roll along the advancing direction of the receiving substrate, and removing the adhesive or irradiating the light to remove the sticking layer.

7. The selective continuous transferring apparatus of claim 1, wherein a plurality of the rolls is arranged adjacent to each other for the transferring.

\* \* \* \* \*